Feb. 16, 1960 O. GARAPOLO ET AL 2,924,924
MACHINE FOR PACKAGING HAM
Filed Oct. 4, 1955 6 Sheets-Sheet 5
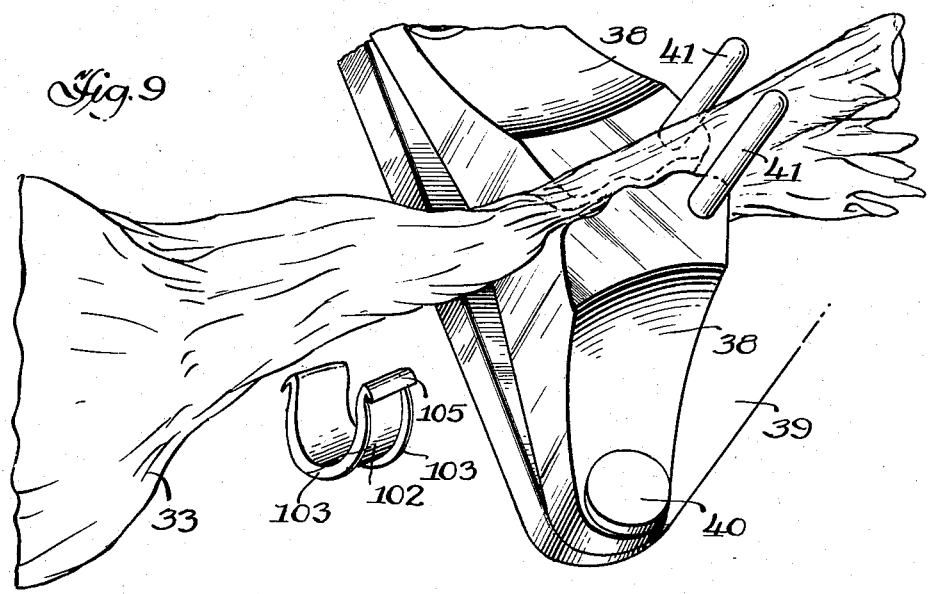
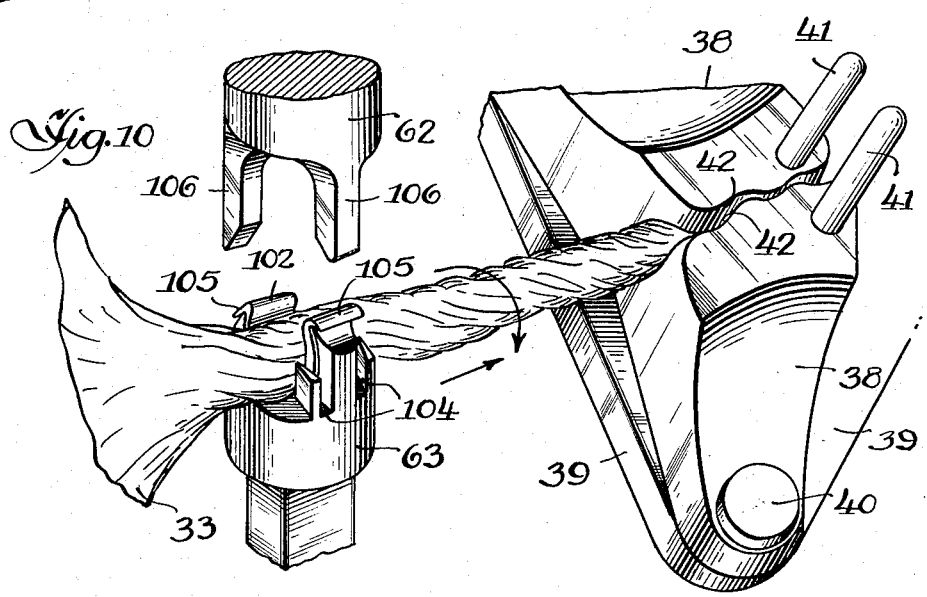
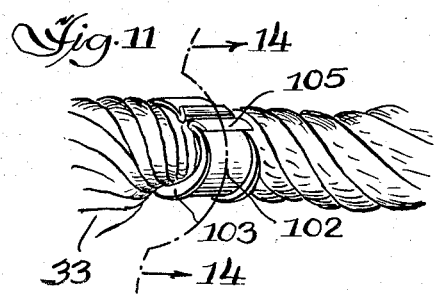
Inventors,
Orlando Garapolo
and Edwin J. Robertson
By: Schneider & Dressler,
Attys.

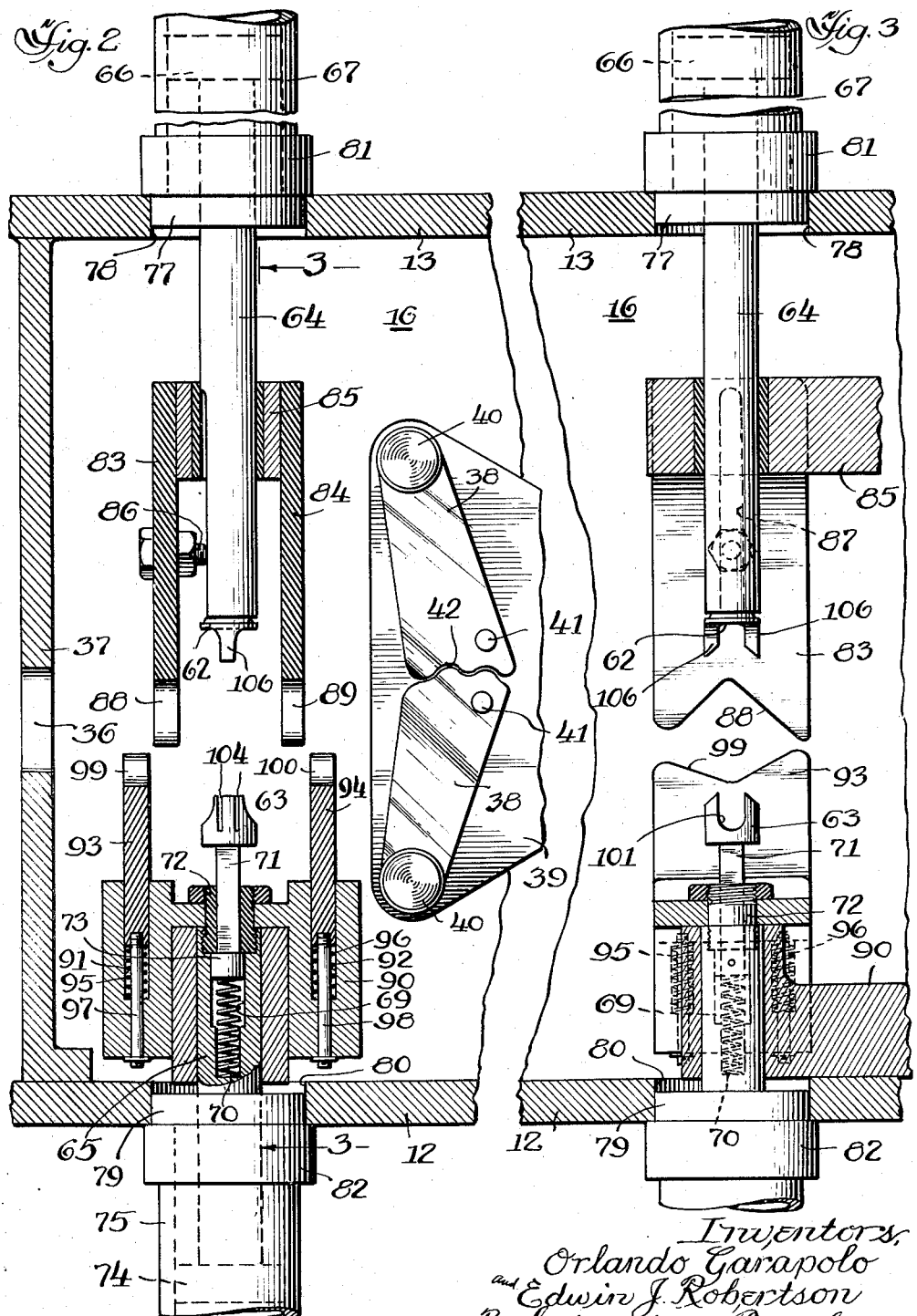

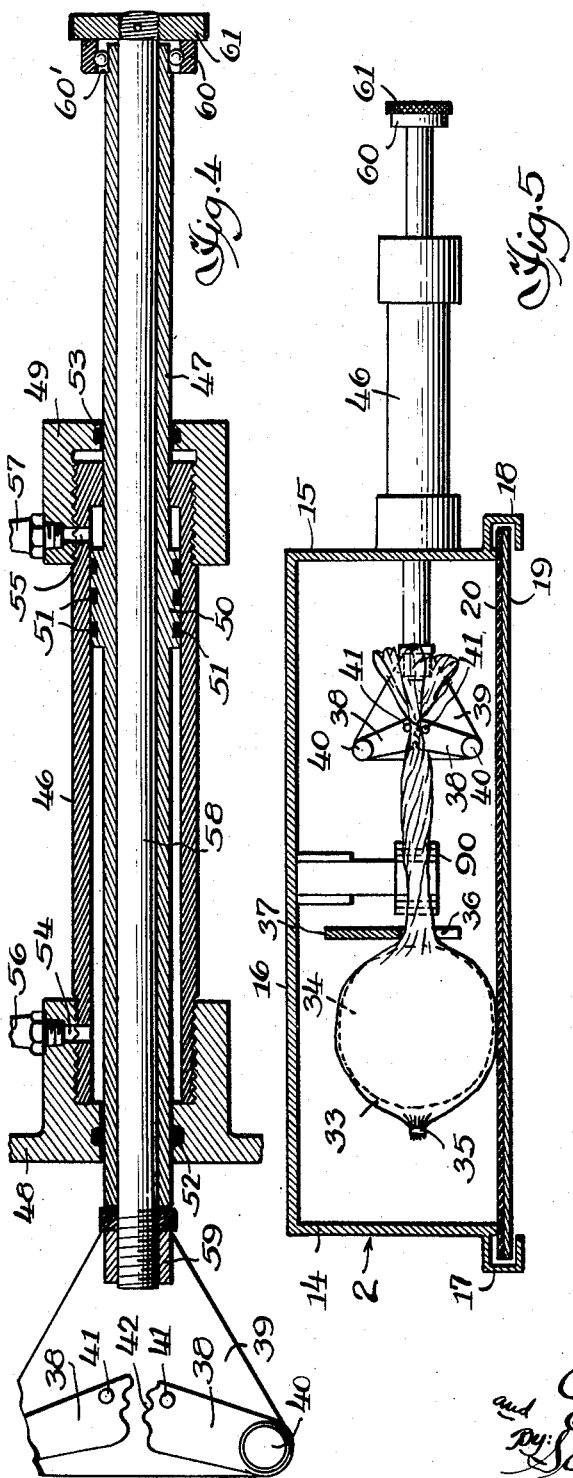
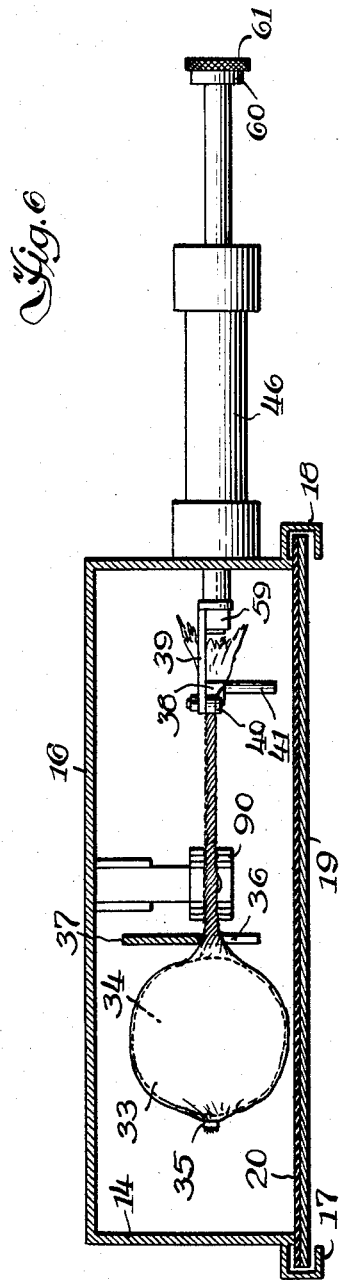

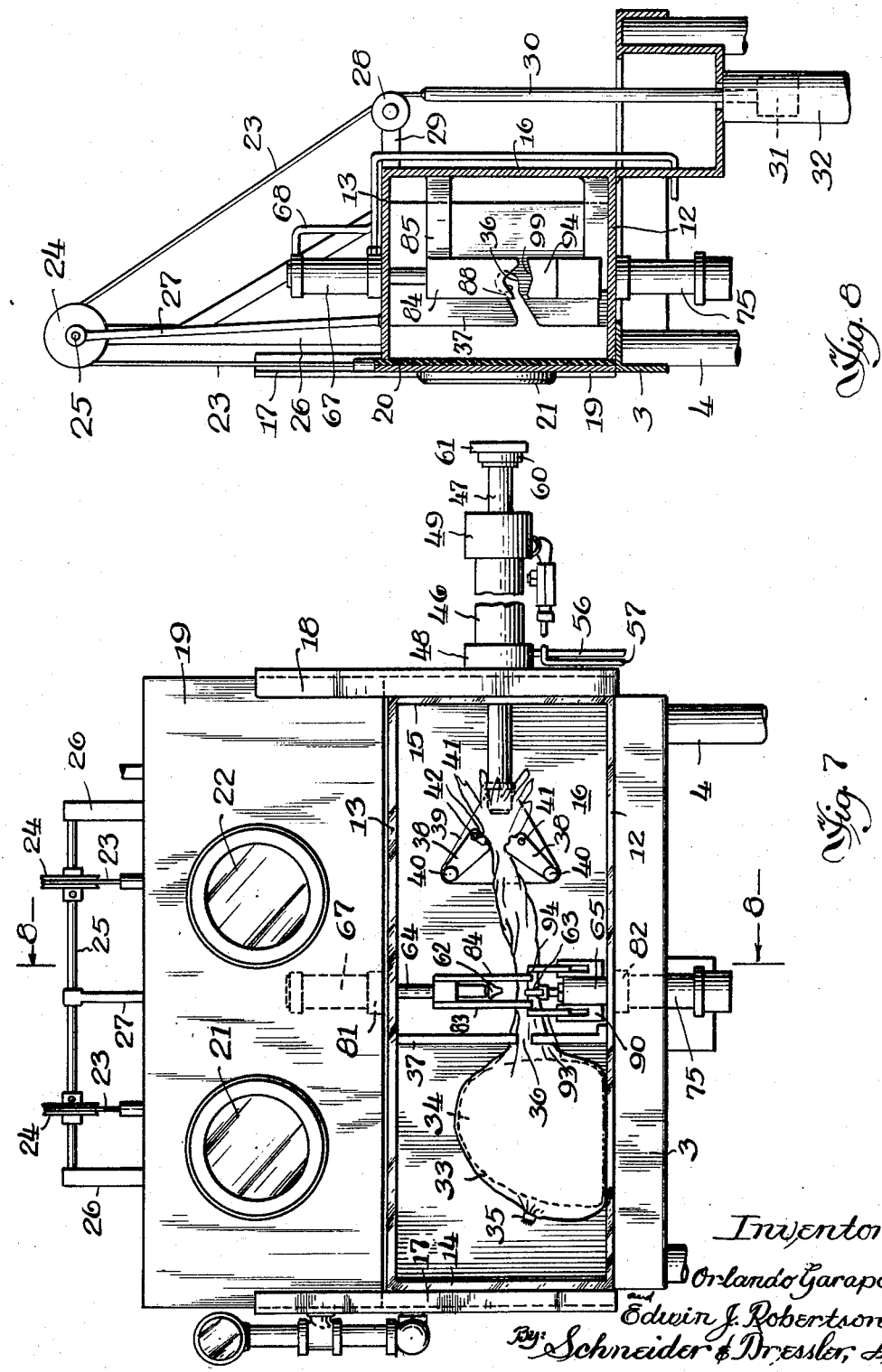

Feb. 16, 1960 O. GARAPOLO ET AL 2,924,924
MACHINE FOR PACKAGING HAM
Filed Oct. 4, 1955 6 Sheets-Sheet 6
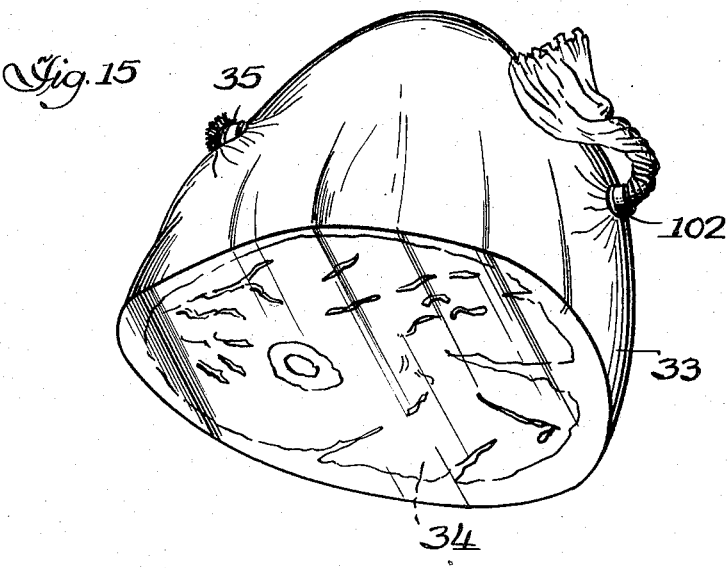
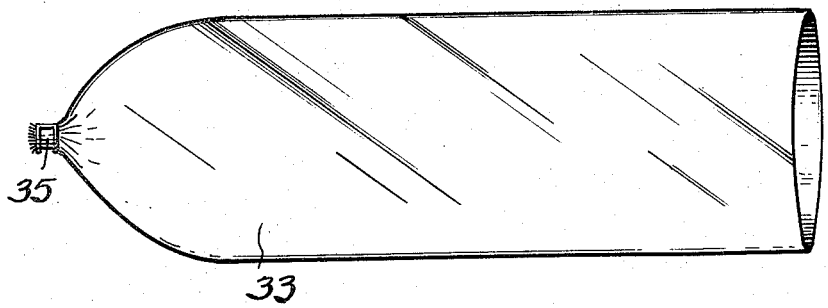
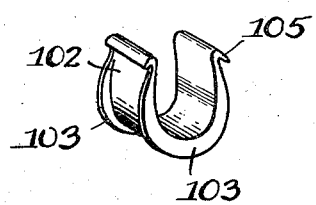
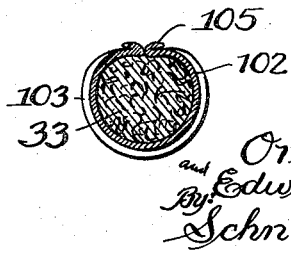

United States Patent Office 2,924,924
Patented Feb. 16, 1960

2,924,924

MACHINE FOR PACKAGING HAM

Orlando Garapolo and Edwin J. Robertson, Chicago, Ill., assignors to Wilson & Co., Inc., a corporation of Delaware Application October 4, 1955, Serial No. 538,427

8 Claims. (Cl. 53—112)

This invention relates to a machine for and a method of packaging ham and other meat in a transparent protective bag.

It is customary to split hams into shank and butt ends, and to wrap each end in a transparent wrapper to protect it and permit its display in the store where it is sold to the consumer. Hereafter, in order to facilitate description of the invention the term "ham" will re referred to in a generic sense, it being understood that the term may refer to either a shank or butt end. The means heretofore known for packaging hams did not afford maximum protection for the ham because the package was not sufficiently airtight, and contact with air caused discoloration and the formation of mold and slime on the ham. Ordinarily a ham may not be displayed more than one to three weeks before it becomes discolored so that it requires refacing. In order to reface the ham, it is removed from the wrapper and a thin slice is cut from its exposed surface. The ham is then wrapped again. Since the choice cut of the ham is exposed, the portion of the ham cut away in the refacing operation is the most valuable portion, and the refacing operation entails considerable loss to the dealer, both in the waste of highly priced meat, and in the time and material required to rewrap the ham. The shortness of the period of time during which the ham may be displayed without deterioration has heretofore made it impractical for meat packers to package hams for display, because the length of time required for a ham to travel from the packer to the retailer through regular trade channels does not leave enough time for display of the ham before deterioration starts.

In accordance with the present invention, the ham is packaged in a bag of suitable transparent protective material such as polyvinylidine chloride, rubber hydrochloride, or a laminated film of polyvinylidine chloride and cellophane. The bag is preferably formed by twisting one end of a tubular length of suitable material and then sealing the twisted end by securing a clamp to it. This may be done either before or after the ham to be packaged is placed in the tubular member. Although a preformed bag having one sealed end may be used, it is preferred to use a tubular length of the desired material because it facilitates the fabrication of a bag of any desired length without substantial waste and does not require that a stock of bags of different sizes be kept on hand. The tubular members may be kept in long lengths and cut to any desired length when required.

After the ham is placed in the bag, the bag, with the ham positioned therein, is placed in the cabinet of the machine. The cabinet and the bag are then evacuated, and the open end of the bag is then twisted and sealed by another clamp. The clamps do not have to be tight against the ham, but it is preferred to position them fairly close to the ham to enhance the appearance of the package. The ham is preferably positioned in the bag in such a manner that the clamps are adjacent opposite sides of the ham. This arrangement permits the cut surface of the ham to be displayed through an unobstructed portion of the transparent bag. The application of clamps to the twisted ends of the tubular material forms an airtight package having an oxygen content not greater than 3%. If desired, the oxygen may be entirely displaced by the application of nitrogen or other suitable gas. The package, with the ham in a substantial vacuum, or in nitrogen or other suitable gas, may be displayed under ordinary display and sales conditions for a period of from three to six months without discoloration of the ham, or the formation of mold or slime thereon.

This added length of time during which the ham may be displayed without deterioration is extremely important in that it permits the ham to be packaged by the meat packer and still reach the retailer in time to permit display for a substantial time before it must be sold. Retailers cannot package the hams properly for display, because they do not have means for evacuating the bag or for displacing the oxygen by nitrogen or other suitable gas.

To provide more adequate protection for the package, any sharp surface, such as the end of a bone, that may otherwise tear the transparent protective bag, is preferably covered by a piece of suitable material, such as regenerated cellulose, before the meat is placed in the bag. The regenerated cellulose will stick to the area to which it is applied if it is pressed against the meat with very slight pressure, and will not detract from the appearance of the package since it is also transparent.

The machine is not limited to the packaging of hams, but may be used for the packaging of other meats, such as hot dogs, in a transparent protective wrapper or bag so that such other meats may also be displayed for sale for a considerable length of time without spoiling their appearance. If the meat packaged is comparatively small, as in the case of hot dogs, so that several are packed in a single wrapper or bag, the voids between the individual pieces of meat are preferably filled with nitrogen, or other suitable gas, in order to exclude any substantial amount of air from within the package.

The structure by which the above mentioned and other advantages of the invention are attained will be described in the following specification, taken in conjunction with the accompanying drawings, showing a preferred illustrative embodiment of the invention, in which:

Fig. 2 is a fragmentary vertical sectional view showing the clamping means;

Fig. 3 is a vertical sectional view, taken along the line 3—3 of Fig. 2;

Fig. 4 is a longitudinal sectional view of the means for twisting the neck of the bag;

Fig. 5 is a view, partly in elevation and partly in section, showing the open end of the bag with a portion thereof held in the twisting jaws;

Fig. 6 is a view similar to Fig. 5, showing the next step in the process of packaging the meat, with the bag end tightly twisted and ready for the clamping operation;

Fig. 7 is a front elevational view of the machine with the door in open position and the twisting jaws ready for engagement with a portion of the open end of the bag;

Fig. 8 is a cross sectional view, taken along the line 8—8 of Fig. 7, but with the bag omitted, and with the door of the machine in closed position;

Fig. 9 is an enlarged fragmentary detail perspective view showing the open bag end with a portion thereof held in the twisting jaws before the twisting operation and with the clamp in position to receive the bag end;

Fig. 10 is a view similar to Fig. 9 showing the bag end twisted and positioned in the clamp, with the dies in position to close the ends of the clamp around the twisted bag end;

Fig. 11 is a fragmentary detail perspective view showing the clamp secured to the twisted bag end;

Fig. 12 is a detail perspective view of the tubular bag member with one end clamped and the other end open;

Fig. 13 is a detail perspective view of the clamp;

Fig. 14 is a cross sectional view taken along the line 14—14 of Fig. 11, showing the clamp applied to the twisted bag end; and Fig. 15 is a perspective view of the completed package with both ends of the bag clamped to hold a ham with the center cut thereof exposed through the transparent protective material of the bag.

Figure 1:
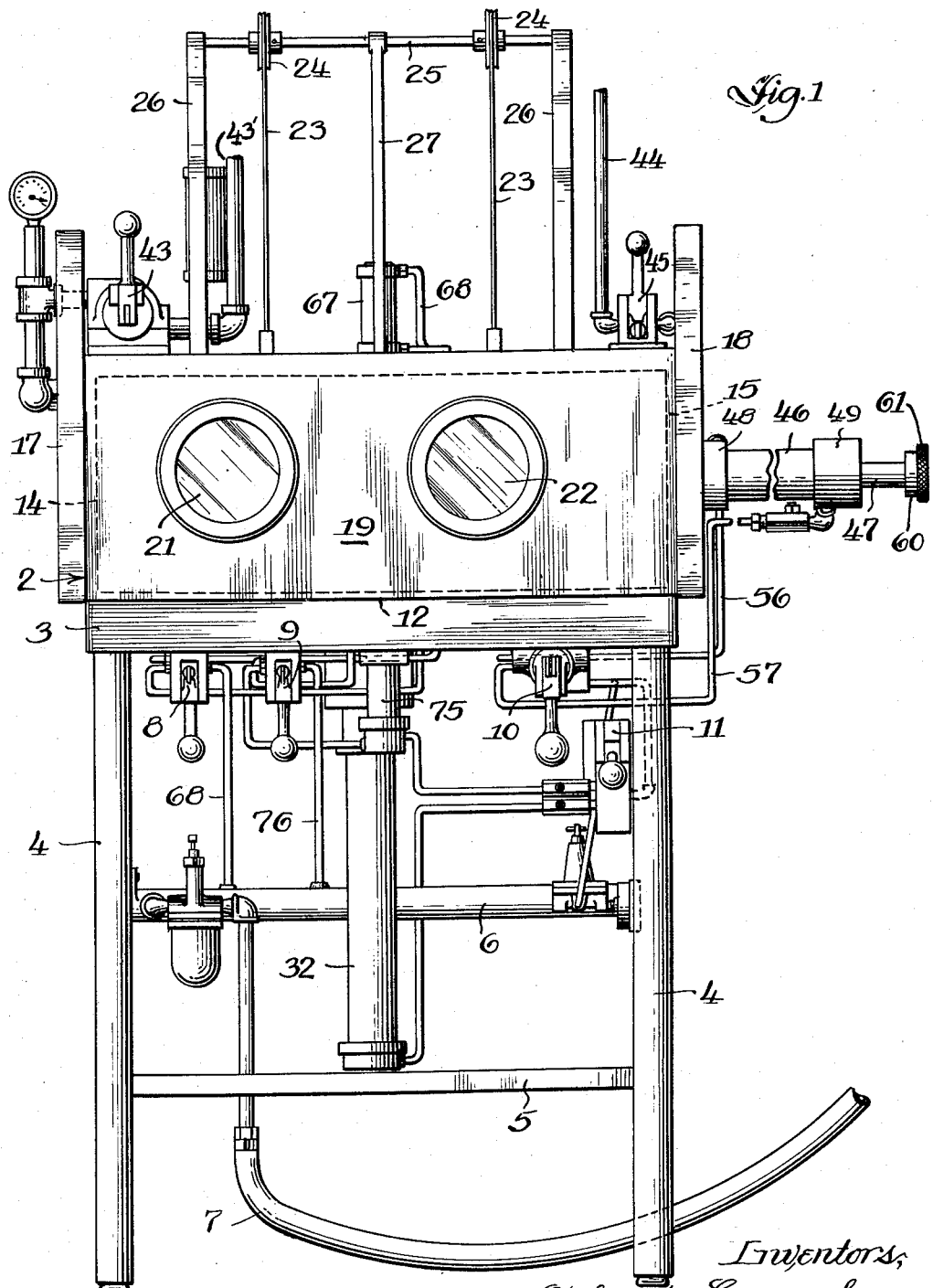
Figure 1 is a front elevational view of a machine embodying the invention.

Referring to Fig. 1 of the drawings, the machine comprises a cabinet 2 mounted on platform or base 3. Base 3 is supported by a plurality of posts 4 suitably reinforced by cross bars 5. A manifold 6, secured at its ends to posts 3 is connected to an air line 7 adapted to furnish air under pressure to the manifold. A plurality of valves 8, 9, 10 and 11, mounted on the underside of base 3, are connected to manifold 6 to operate various parts of the apparatus hereinafter described.

Cabinet 2 comprises a bottom wall 12, top wall 13, side walls 14 and 15, and a back wall 16. A pair of vertical channel members 17 and 18 extend upwardly at the front edge of each side wall. Channels 17 and 18 extend from the plane of the bottom of the cabinet upwardly above the top wall. The open ends of channels 17 and 18 face inwardly, and the rear wall of each channel is secured to the adjacent side wall of the cabinet slightly rearwardly of the front edge of the side wall, as shown in Fig. 5.

A door 19 has its vertical edges slidably mounted in channels 17 and 18. A lining 20 of rubber or suitable composition is applied to the inner surface of the door to form a sealing engagement with the front edges of side walls 15 and 16 to provide an airtight enclosure when the door is closed and cabinet 2 is evacuated as hereinafter described. Door 19 is provided with two windows 21 and 22 to permit viewing of the inside of the cabinet when the door is closed.

As shown in Fig. 8, door 19 is suspended on a pair of cords 23, each of which passes over a pulley 24 mounted on a bar 25 which is rotatably mounted in supports 26 and 27 projecting above the top of the cabinet. The opposite end of cord 23 passes over a pulley 28, supported on a bracket 29 extending rearwardly from back wall 16, and is secured to one end of a piston rod 30. The other end of piston rod 30 is secured to a piston 31 reciprocably mounted in a cylinder 32. Cylinder 32 is connected through valve 11 with manifold 6 and piston 31 is reciprocated by the pressure of air controlled by valve 11. Door 19 is lifted upwardly by downward movement of piston 31. When piston 31 is moved upwardly in cylinder 32, door 19 moves downwardly by gravity. The upward movement of piston 31 controls the downward movement of door 19 and prevents it from slamming shut, because the rate of movement of the door in either direction is the same as the rate of movement of the piston.

When door 19 is in open position as shown in Fig. 7, a bag 33, with a ham 34 therein, is positioned in cabinet 2. The bag is preferably a tubular length of suitable transparent protective material. If the ham has any sharp edge of a bone close to its surface, a piece of regenerated cellulose is placed over the surface to cover the sharp edge before the ham is placed in the bag. One end of the bag may be closed, preferably by twisting the end and securing a clamp 35 thereto, although it may be sealed in any suitable manner. The twisted end of the bag is cut off just beyond the edge of the clamp. The end of the bag may be closed before or after the ham is placed therein.

The open end of the bag is loosely twisted and positioned so that it extends through a slotted opening 36 in a guide plate 37, and the lower portion of the bag end is positioned between a pair of holding jaws 38 pivoted to a plate 39, as indicated at 40. Plate 37 is rigidly secured in cabinet 2, for a reason hereinafter disclosed. Jaws 38 are each provided with a stud 41 to facilitate manual adjustment of the jaws before the cabinet door is closed. The meeting edges of the jaws are undulated, as indicated at 42, to provide a better gripping surface. When the open end of the bag is held with the lower portion thereof tightly clamped by jaws 38 the door 19 is closed. A valve 43 controlling a line 43' to a vacuum pump (not shown), is then operated to evacuate the cabinet. Since the upper portion of the end of bag 33 held by jaws 38 is open, the bag will be evacuated at the same time. The open end of the bag may be closed, or, if desired, the cabinet and bag may be filled with nitrogen or other suitable gas to replace the air which has been removed. A gas line 44, controlled by a valve 45, provide gas for the apparatus when it is desired to replace the air from the bag with gas. When the bag is in the desired condition, either evacuated, or filled with nitrogen or other suitable gas, it is ready for the closing operation, which is performed before the door of the cabinet is opened.

As shown in Figs. 4 and 7, an air cylinder 46 extends horizontally from side wall 16 outwardly of cabinet 2. A tubular sleeve 47 extends through both ends 48 and 49 of the air cylinder and through side wall 15 into the cabinet. Sleeve 47 is provided with a circumferential enlargement 50 intermediate its ends which is positioned between the ends of the air cylinder and fits snugly against the inner surface of the air cylinder to serve as a piston. The outer surface of piston 50 is notched to receive sealing gaskets 51. Ends 48 and 49 of air cylinder 46 are each provided with a gasket 52 and 53, respectively. Gaskets 52 and 53 prevent the escape of air which is forced into cylinder 46 on opposite sides of piston 50 through ports 54 and 55, respectively, to reciprocate sleeve 47 longitudinally in its horizontal plane. Ports 54 and 55 are controlled by valve 10 to which they are connected by air lines 56 and 57, respectively.

A shaft 58, rotatably mounted in sleeve 47, projects beyond each end of the sleeve. A nut 59 is fixed to the end of shaft 58 within cabinet 2 in abutting relationship to one end of sleeve 47. The opposite end of sleeve 47 is reduced in diameter to provide an external shoulder 60', and a bearing 60 is rotatably mounted on the reduced end portion of the sleeve. A knurled nut 61 is fixed to the outer end of shaft 58 in abutting relationship to bearing 60. Nuts 59 and 61 cause shaft 58 to move longitudinally upon longitudinal movement of sleeve 47.

Plate 39 is rigidly secured to nut 59 in offset relationship to the axial center of shaft 58. The offset permits the meeting edges of jaws 38 to be aligned with the axial center of shaft 58, so that rotational movement of shaft 58 rotates the jaws without moving their meeting edges from the axial center line.

After the bag 33 in cabinet 2 is evacuated and, if desired, is filled with nitrogen or other suitable gas surrounding ham 34 contained therein, the open end of the bag, the lower portion of which is held between jaws 38 during the evacuation and gas filling operation, is stretched slightly by outward horizontal movement of shaft 58. This slight outward movement of shaft 58 pulls plate 39 outwardly and causes jaws 38 to act as toggles to tighten their grip on the lower portion of the end of bag 33 and to hold it taut. Shaft 58 is manually rotated to twist the end of the bag while it is held in taut condition by jaws 38. This twisting and pulling on the end of the bag tightly closes the end of the bag adjacent clamping jaws 38 and pulls the bag against guide plate 37 which holds the ham and bag from further longitudinal movement in the direction of pull.

The twisting and pulling of the bag end holds it tautly in a straight line extending from opening 36 in plate 37 to jaws 38, and causes it to extend between an upper die 62 and a lower die 63 which are aligned vertically in the portion of cabinet 2 between guide plate 37 and plate 39. As shown in Figs. 2 and 3, upper die 62 is mounted on a vertically movable ram 64, and lower die 63 is mounted on a vertically movable ram 65. Ram 64 is secured to a piston 66 reciprocably mounted in a cylinder 67 connected to manifold 6 by an air line 68 which is controlled by valve 8. Die 63 is mounted in a recess 69 extending downwardly from the top of ram 65. A compression spring 70 is seated in recess 69 and bears against the lower end of die 63 to provide a resilient cushion for die 63. Die 63 has a shank 71 which passes through the opening of a bushing 72 threaded into the top of ram 65. Shank 71 and the opening in bushing 72 are square in cross section, to prevent rotational movement of die 63. The lower end of shank 71 is provided with an enlarged end 73 below bushing 72 to prevent accidental separation of die 63 from ram 65.

Ram 65 is secured to a piston 74 reciprocably mounted in a cylinder 75. Cylinder 75 is connected to manifold 6 by an air line 76 which is controlled by valve 9. Cylinder 67 has a flange 77 fitting into an opening 78 in top wall 13 of cabinet 2, and cylinder 75 has a similar flange 79 fitting in an opening 80 is bottom wall 12. An enlarged section 81 on cylinder 67, and a corresponding enlarged section 82 on cylinder 75, extend beyond the circumference of openings 78 and 80, respectively, to provide airtight joints between cabinet 2 and each of the cylinders 67 and 75.

Guide bars 83 and 84 are mounted on a supporting bracket 85 extending forwardly from back wall 16 of cabinet 2. Guide bars 83 and 84 are positioned on opposite sides of ram 64, and a stud 86 projecting laterally from bar 83 extends into a slotted recess 87 in ram 64 to maintain bars 83 and 84 in parallel relationship to ram 64. Bar 83 has an inverted V-shaped notch 88 in its lower edge, and bar 84 is provided with a similar notch 89.

A yoke 90, mounted on ram 65, is provided with recesses 91 and 92 on opposite sides of the ram. A guide bar 93 is mounted in recess 91, and a similar guide bar 94 is mounted in recess 92. Springs 95 and 96 are positioned in recesses 91 and 92, respectively, to provide a cushion for each guide bar 93 and 94. Screws 97 and 98, extending upwardly through the bottom of yoke 90, are threaded into the bottom of guide bars 93 and 94, respectively, to prevent separation of the guide bars from the yoke. Guide bar 93 is provided on its upper edge with a V-shaped notch 99, and guide bar 94 has a similar notch 100. Guide bars 93 and 94 move vertically, with vertical movement of ram 65, in planes parallel to but spaced outwardly of the planes in which guide bars 83 and 84 are moved.

Lower die 63 is provided on its upper edge with a U-shaped recess 101 and before the start of each ham packaging process a clamp 102 is placed in the recess. Clamp 102 is provided at each edge with a flange 103, and the sides of die 63 are recessed, as indicated at 104, to receive the flanges 103 of the clamp positioned in recess 101. The upper edges of clamp 102 are bent outwardly to form flanges 105 for additional rigidity. Upper die 62 is provided with a pair of depending fingers 106 adapted to engage flanges 105 when dies 62 and 63 are brought together.

Notches 88, 89, 99 and 100 each have their centers aligned with the center of notch 101 so that as dies 62 and 63 are moved towards each other the notches of guide bars 83 and 84 cooperate respectively with the notches of guide bars 93 and 94 to form closed diamond shaped areas which decrease in size to bring the twisted end of bag 33 into alignment with notch 101. The circumference of the twisted bag end is entirely contained within clamp 102 at the time fingers 106 of the upper die engage flanges 105 of the clamp to bring the flanges into the abutting relationship shown in Fig. 11.

The process of packaging the ham will be briefly summarized. One end of a tubular length of suitable transparent protective material 33 is twisted and sealed with a clamp 35 to form a bag open at one end. A ham 34 is then placed in the bag, with the cut face of the ham spaced from the clamp. If the ham has a sharp surface, such as that caused by the end of a bone, the sharp surface is covered by a piece of regenerated cellulose before the ham is put in the bag. The bag, with the ham therein, is then placed in cabinet 2 on the left side of guide plate 37, as viewed in Fig. 7. The open end of the bag is extended through slot 36, between guide bars 83, 84 and 93, 94 and a portion thereof is poistioned between jaws 38. Jaws 38 are then manually moved pivotally to grasp a portion of the bag end without closing the entire end portion. Door 19 is then closed by actuation of valve 11.

Valve 43 is then actuated to make cabinet 2 airtight and evacuate the bag. If the ham is to be packaged in an atmosphere of nitrogen or similar gas, valve 45 is actuated to fill the cabinet with gas. Air cylinder 46 is then actuated, by means of valve 10, to move plate 39 slowly to the right, thereby causing jaws 38 to move their undulated surfaces 41 into engagement to grasp a portion of the end of bag 33 firmly. At the same time nut 61 is rotated manually to rotate plate 39 and thereby twist the end of the bag. The movement of plate 39 to the right continues, pulling the ham and bag against plate 37 and then holding the end of the bag taut as it is being twisted. When the end of the bag is twisted tightly and is taut so that it extends in a straight line from slot 36 to jaws 38, the longitudinal movement of plate 39 is stopped. In this position the tightly twisted end of the bag is aligned with the notches of guide bars 83, 84, and 93 and 94.

Valve 9 is then actuated to raise lower die 63 to its uppermost position. In this position the edges of notches 99 and 100 intersect the planes of notches 88 and 89 to confine the twisted end of the bag within the diamond represented by the edges of notches 88, 89 and 99, 100. While the lower die is held in its uppermost position the upper die 62 is brought downwardly very fast. As the dies move towards each other the size of the diamond decreases, thereby forcing the bag end into clamp 102 by the time the depending fingers 106 of upper die 62 engage flanges 105 of the clamp. Fingers 106 drive the lower die downwardly against the action of spring 70, and the curvature of the upper die moves the upper edges of clamp 102 together around the twisted bag end to form an airtight seal. After the package is removed from cabinet 2 the end of the bag projecting beyond the clamp may be cut off to provide a neater package.

While we have described a preferred embodiment of our invention in considerable detail, it will be understood that the description thereof is intended to be illustrative, rather than restrictive, as many details may be modified or changed without departing from the spirit or scope of the invention. Accordingly, we do not desire to be restricted to the exact construction described.

We claim:

1. An apparatus for forming an airtight package comprising an airtight cabinet adapted to hold an open ended bag containing an article to be packaged, a vacuum pump connected to said cabinet for exahusting the air from said cabinet and said bag, a shaft extending through one wall of said cabinet, a plate mounted on said shaft within said cabinet, a pair of gripping jaws pivoted to said plate, said jaws being adapted to hold the open end of said bag, means for rotating said shaft to twist said bag end, a pair of vertically aligned dies within said cabinet, one of said dies being shaped to receive a clamp, means for moving said one die to position a clamp held thereby into contiguous relationship with a twisted bag end, and means to move said other die into interengagement with said first mentioned die to secure said clamp tightly around said bag end.

2. An apparatus for forming an airtight package comprising an airtight cabinet adapted to hold an open ended bag containing an article to be packaged, a vacuum pump connected to said cabinet for exahusting the air from said bag and said cabinet, a plate movably mounted within said cabinet, a pair of gripping jaws pivotally mounted on said plate, means to move said jaws to grip the open end of said bag, means to move said plate laterally within said cabinet to tighten the grip of said jaws on said bag end and to hold said bag end taut, means accessible from outside said cabinet to rotate said plate within said cabinet to twist said bag end, a pair of vertically aligned dies within said cabinet, and means to move said dies into interengagement to secure a clamp tightly around said bag end.

3. An apparatus for forming an airtight package comprising an airtight cabinet adapted to hold an open ended bag containing an article to be packaged, a vacuum pump connected to said cabinet for exahusting the air from said bag and said cabinet, a plate movably mounted within said cabinet, a pair of gripping jaws pivotally mounted on said plate, means to move said jaws to grip the open end of said bag, means to move said plate laterally within said cabinet to tighten the grip of said jaws on said bag end and to hold said bag end taut, means accessible from outside said cabinet to rotate said plate within said cabinet to twist said bag end, a pair of vertically aligned dies movable vertically within said cabinet, a plurality of cooperating guide bars within said cabinet for aligning said bag end transversely with said dies, and means to move said dies into interengagement to secure a clamp tightly around said bag end.

4. An apparatus for forming an airtight package comprising an airtight cabinet adapted to hold an open ended bag containing an article to be packaged, a vacuum pump connected to said cabinet for exahusting the air from said cabinet and said bag, a shaft extending through one wall of said cabinet, a plate mounted in said cabinet in offset relationship to the axial center of said shaft, a pair of gripping jaws pivotally mounted on said plate, the outer edges of said jaws being adapted to engage each other along a line concentric with the axial center of said shaft, said jaws being adapted to hold the open end of said bag between their outer edges, means to rotate said shaft, rotation of said shaft causing rotation of said jaws around a center aligned longitudinally with the axial center of said shaft to twist said bag end held between said jaws, and means to secure a clamp tightly around said bag end within said cabinet.

5. An apparatus for forming an airtight package comprising an airtight cabinet adapted to hold an open ended bag containing an article to be packaged, a vacuum pump connected to said cabinet for exahusting the air from said cabinet and said bag, a shaft extending through one wall of said cabinet, a plate mounted in said cabinet in offset relationship to the axial center of said shaft, a pair of gripping jaws pivotally mounted on said plate, the outer edges of said jaws being adapted to engage each other along a line concentric with the axial center of said shaft, said jaws being adapted to hold the open end of said bag between their outer edges, means to rotate said shaft, rotation of said shaft causing rotation of said jaws around a center aligned longitudinally with the axial center of said shaft to twist said bag end held between said jaws, a pair of vertically aligned dies movable vertically within said cabinet, a plurality of cooperating guide bars within said cabinet for aligning said bag end transversely with said dies, and means to move said dies into interengagement to secure a clamp tightly around said bag end.

6. An apparatus for forming an airtight package comprising an airtight cabinet adapted to hold an open ended bag containing an article to be packaged, a vacuum pump connected to said cabinet for exhausting the air from said cabinet and said bag, a guide plate extending vertically within said cabinet, said guide plate having a slotted opening for receiving the open end of said bag, a plate movably mounted in said cabinet, a pair of gripping jaws mounted on said plate, said jaws being adapted to hold said open bag end, means for moving said last mentioned plate longitudinally within said cabinet to stretch said bag end taut between said guide plate and said jaws, means for rotating said jaws to twist said bag end, a pair of dies positioned on opposite sides of said bag end between said guide plate and said jaws, and means for moving said dies into engagement with said bag end to secure a clamp tightly around its periphery.

7. An apparatus for forming an airtight package comprising an airtight cabinet adapted to hold an open ended bag containing an article to be packaged, means for gripping and twisting said open bag end within said cabinet, a guide plate engageable with said bag end to hold it in predetermined position, a pair of aligned dies within said cabinet on opposite sides of said bag end, cooperating guide bars associated with said dies, each of said guide bars having a V-shaped notch on one end thereof, the open end of one of said notches facing the open end of the other, the point of the V at the closed end of each of said notches being aligned with the center of said dies, said notches being engageable with said bag end to align said bag end transversely with said dies upon movement of said dies towards each other, and means for moving said dies towards each other to secure a clamp around said bag end.

8. An apparatus for forming an airtight package comprising an airtight cabinet adapted to hold an open ended bag containing an article to be packaged, means for gripping and twisting said open bag end within said cabinet, a guide plate engageable with said bag end to hold it in predetermined position, a pair of aligned dies within said cabinet on opposite sides of said bag end, cooperating guide bars associated in parallel planes with said dies, each of said guide bars having a V-shaped notch on one end thereof, the open end of one of said notches facing the open end of the other, the point of the V at the closed end of each of said notches being aligned with the center of said dies, the notched ends of said guide bars each extending beyond the end of the adjacent die, whereby said notched ends are adapted to pass each other upon movement of said dies towards each other to form a closed diamond shaped area adapted to confine said bag end prior to interengagement of said dies with said bag end, and means for moving said dies into interengagement with said bag end to secure a clamp tightly around its periphery.

References Cited in the file of this patent

UNITED STATES PATENTS

| | | |
|---|---|---|
| 2,102,716 | Berch | Dec. 31, 1937 |
| 2,335,738 | Casey | Nov. 30, 1943 |
| 2,376,583 | De Poix | May 22, 1945 |
| 2,623,826 | Grinstead | Dec. 30, 1952 |
| 2,685,996 | Shoffner et al. | Aug. 10, 1954 |
| 2,733,564 | Russell et al. | Feb. 7, 1956 |
| 2,744,370 | Seragnoli | May 8, 1956 |
| 2,795,092 | Rabinowitz | June 11, 1957 |